3,024,951
FERTILIZER DISTRIBUTOR METERING-PLATE GUIDE

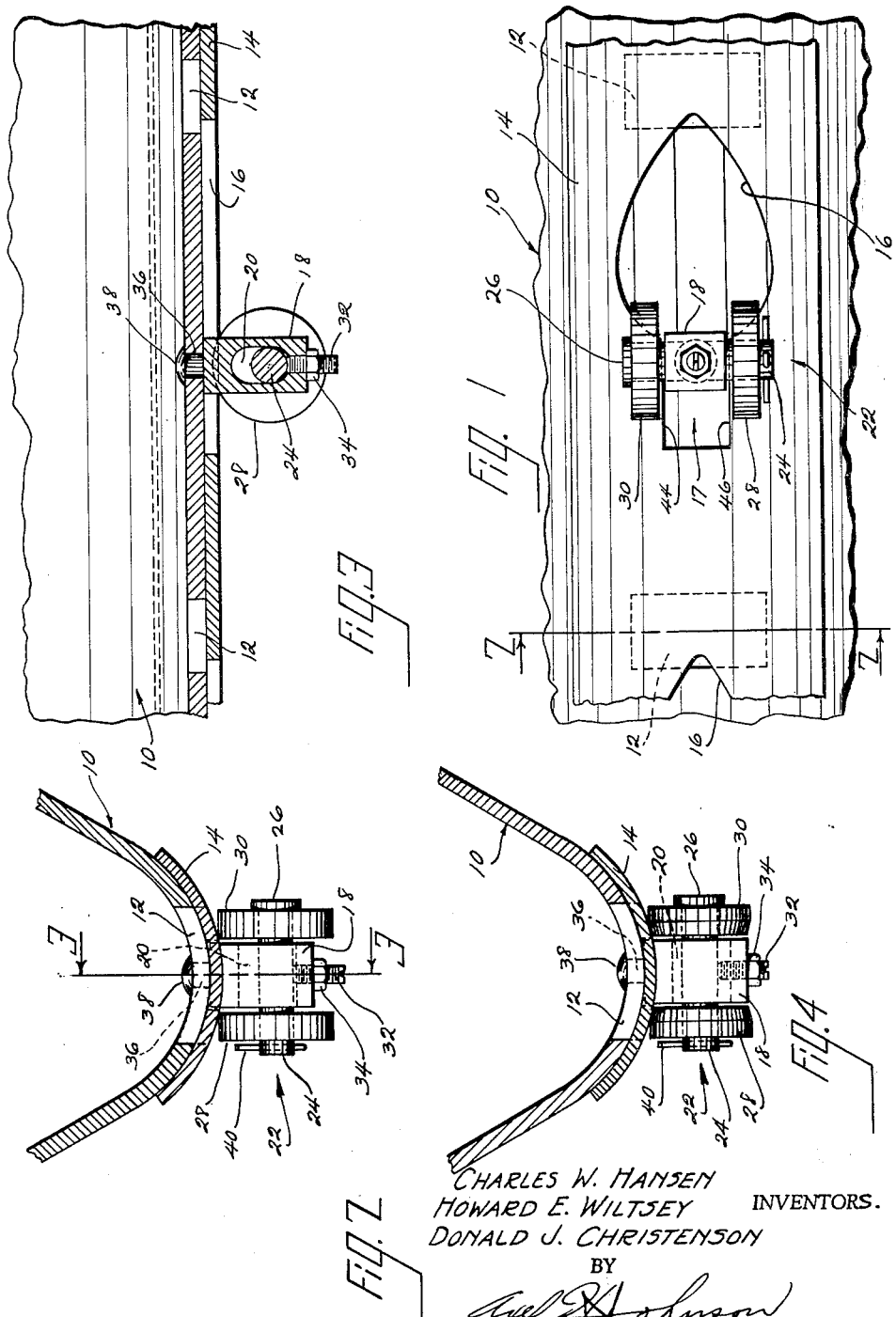

Charles W. Hansen and Howard E. Wiltsey, Racine, and Donald J. Christenson, Kansasville, Wis., assignors to J. I. Case Company, Racine, Wis., a corporation of Wisconsin
Filed Dec. 17, 1958, Ser. No. 781,073
4 Claims. (Cl. 222—485)

This invention relates to fertilizer distributors of the type having a hopper and a sliding metering plate in contact with the bottom portion thereof and especially to a means for maintaining intimate contact between the bottom of the hopper and the metering plate. Fertilizer distributor hoppers and metering plates usually are of corrodible material such as sheet steel, and commercial fertilizers are very corrosive and attack the sliding surfaces of the hopper and slide so that adjustment becomes difficult. Corrosion also roughens the surfaces and impairs leakproof operation. Clips customarily used to maintain constant contact, present considerable surface to the sliding metering plate and require frequent adjustment. In addition, the fertilizer material gradually finds its way between the surfaces if adjustments are not made when necessary, and increases the resistance to sliding of the metering plates. The conventional arrangements using clips or guides at the edges of the plates do not keep the plates in intimate contact with the hopper bottom at the areas surrounding the openings, because the clips are at some distance from the openings. This results in leakage when handling fine dry material.

The object of this invention is to provide a means for maintaining constant leak proof contact between the metering plate and the bottom of the hopper.

Another object is to provide means for maintaining contact between the metering plate and the hopper which means is not apt to be rendered inoperative because of corrosion.

Another object is to provide a convenient means for adjusting the contact pressure between the hopper and the metering plate.

Further objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention.

Referring to the drawing, FIG. 1 is a fragmentary view of a fertilizer distributor hopper looking upwardly toward the bottom and showing the invention.

FIG. 2 is a fragmentary sectional view taken at 2—2 of FIG. 1.

FIG. 3 is a fragmentary sectional view taken at 3—3 of FIG. 2.

FIG. 4 is a view similar to FIG. 2 but showing the adjusting rollers after they have become worn and have been readjusted.

Referring to the drawing, 10 indicates the hopper of a fertilizer distributor which is shaped in the form of a trough and has a cylindrical bottom portion. Hopper 10 is made of steel or other suitable material and is provided with spaced openings 12, a suitable number of which are provided in the hopper bottom. Other details of the fertilizer distributor will be referred to when necessary, in order to properly describe the present invention.

A sliding metering plate 14 is provided which is of a cylindrical shape and conforms closely to the shape of the bottom of hopper 10. Plate 14 must fit the bottom of hopper 10 closely in order that commercial fertilizer in pulverized form will not readily escape between the sliding surfaces. Plate 14 is provided with a plurality of metering openings 16 of a number corresponding to the number of openings 12 and which openings are shaped so that sliding of plate 14 will position metering openings 16 so as to uncover openings 12, permitting fertilizer to escape from the hopper to the soil. Openings 16 are so shaped that the quantity of fertilizer distributed will increase rapidly as the position of the openings 16 is adjusted relative to openings 12.

A plurality of posts 18 are secured to the bottom of hopper 10 and positioned so that a post is located within each of a suitable number of openings 16 as shown in FIG. 1. A rectangular portion 17 of opening 16 provides clearance for the post 18 so that the latter will not interfere with the sliding of plate 14 to its extreme "open" position.

Post 18 is provided with an elongated opening 20 and a shaft 22 is provided which can be shifted vertically from one end to the other of the elongated opening 20. The purpose of this opening will be explained later in the description. Shaft 22 comprises a shank portion 24 and a head 26. A pair of rollers 28 and 30 of non-corrosive material such as nylon is provided and which rollers are journalled on shaft 22. Rollers 28 and 30 are placed one on each side of post 18 as shown in FIGS. 1 and 2. Rollers 28 and 30 are of a diameter such that they will contact the lower surface of plate 14 when shaft 22 is substantially in its lower-most position as shown in FIG. 3. An adjusting screw 32 is threadedly engaged in post 18 in a position such as to contact the shank portion 24. A lock nut 34 fitted on screw 32 serves to lock the latter after an adjustment has been made. Post 18 is provided with a shank 36 which is fitted into a hole in hopper 10 and riveted as at 38. Shaft 22 and rollers 28 and 30 are assembled as shown. A cotter pin 40 is inserted in a hole in shank 24 to prevent axial displacement of the shaft 22. After a period of use it will be found that rollers 28 and 30 may have become worn and the sliding metering plate 14 will not make intimate contact with hopper 10. It is then necessary to adjust the shaft 22 upwardly relative to the opening 20. This is done by loosening lock nut 34 and turning set screw 32 against shank 24 thereby shifting the latter to a position where rollers 28 and 30 again contact metering plate 14 thus restoring the original intimate contact between metering plate 14 and the hopper 10.

FIG. 4, shows the relative position of the shaft 22 and the worn rollers 28 and 30, after an adjustment has been made. Set screw 32 has raised shaft 22 upwardly in the opening 20. It will be clear that this arrangement provides a novel and easily adjusted means for maintaining contact between the sliding metering plate 14 and the hopper 10. The pressure exerted between the surfaces of hopper 10 and plate 14 by rollers 28 and 30 is constantly uniform because shaft 22 is free to rock in the plane of FIGS. 2 and 4.

In order to maintain a single linear sliding position of plate 14 against rotation about its axis of revolution, it is necessary to key the plate. This is accomplished by extending opening 16, so that it has a rectangular portion 17 which is provided with parallel sidewalls 44 and 46. The latter walls define a space freely confining the post 18. It will be apparent from inspection of FIG. 1 that when plate 14, is moved to the right or left, the post 18, by reason of its contact with parallel sidewalls 44 and 46, will guide plate 14 in a linear direction and prevent its rotation about its axis of curvature. The openings 16 are of a width to permit removal of plate 14 without disturbing rollers 28 and 30 or shaft 22.

The above being a complete description of an illustrative embodiment of the invention, what is claimed as new and desired to be secured by Letters Patent of the United States is:

1. In a metering plate guide means for a fertilizer distributor having a hopper, the bottom portion of said hopper being of a cylindrical contour about an axis transverse to the direction of movement of the fertilizer distributor and being provided with downwardly open hopper apertures, in combination, a metering plate conforming to said bottom portion, slidable longitudinally thereof and provided with a plurality of metering apertures cooperable with said hopper apertures to release fertilizer from said hopper, one end of each of said metering apertures having opposed sides parallel to said axis, a plurality of posts depending from and secured to said bottom, one of said posts extending through each of a plurality of said metering apertures and of a width to engage said sides, each of said posts having a vertically-elongated aperture transverse to said axis, a transverse shaft in said elongated aperture, a pair of rollers journaled on said shaft, one roller being positioned on each side of said post and of a diameter so as to contact the lower surface of said metering plate, and adjusting means positioned in said post, contacting said shaft, and urging said rollers into contact with said metering plate.

2. In a metering plate guide means for a fertilizer distributor having a transverse hopper, the bottom portion of said hopper being of a curved contour about a transverse axis and being provided with downwardly open hopper apertures, in combination, a metering plate conforming to said bottom portion slidable longitudinally thereof and provided with metering apertures cooperable with said hopper apertures to release fertilizer from said hopper, one end of each of said metering apertures having sides parallel to said axis, a plurality of posts of a width to engage said sides and depending from said bottom, one of said posts extending through each of a plurality of said metering apertures and below said metering plate, each of said posts having a vertically elongated aperture transverse to said axis, a transverse shaft in said elongated aperture, a pair of rollers journaled on said shaft, one roller being positioned on each side of said post and of a diameter so as to contact the lower surface of said metering plate, and adjusting means in said post between said rollers contacting said shaft and urging said rollers into engagement with said metering plate.

3. In a metering plate guide means for a fertilizer distributor having a transverse hopper, the bottom portion thereof being curvate about a transverse axis and provided with downwardly-open hopper apertures, in combination, a curvate metering plate conforming to said bottom, slidable longitudinally thereon and provided with metering apertures cooperable with said hopper apertures to release fertilizer from said hopper, a plurality of posts depending from said bottom, each of said posts extending through one of said metering apertures, each of said posts having an elongated aperture transverse to said axis, a transverse shaft in said elongated aperture, a pair of rollers journaled on said shaft, one roller being positioned on each side of said post, and means engaging said shaft and urging said rollers into positive engagement with said metering plate.

4. In a metering plate guide means for a fertilizer distributor of the type having a hopper provided with a bottom having a hopper aperture, in combination a metering plate slidably contacting said bottom and having a metering aperture cooperating with said hopper aperture to release fertilizer from said hopper, one end of said metering aperture having opposed parallel sides, a post secured to said bottom and extending through said metering aperture between and in guiding engagement with said parallel sides, a shaft on said post, rollers on said shaft on each side of said post, contacting said plate, and means to adjust said rollers into rolling contact with said metering plate.

References Cited in the file of this patent

UNITED STATES PATENTS

| | | |
|---|---|---|
| 624,243 | Pracht | May 2, 1899 |
| 2,337,022 | Beiderman | Dec. 21, 1943 |
| 2,703,193 | Seltzer | Mar. 1, 1955 |
| 2,704,624 | Seltzer | Mar. 22, 1955 |
| 2,736,470 | Loomans | Feb. 28, 1956 |
| 2,760,685 | Underwood | Aug. 28, 1956 |